(Model.)

H. O. WHYMAN.
NUT LOCK.

No. 378,563.  Patented Feb. 28, 1888.

Witnesses

Inventor,
H. O. Whyman.
By his Attorneys,
Leggett and Leggett

UNITED STATES PATENT OFFICE.

HORATIO O. WHYMAN, OF NORFOLK, NEBRASKA.

NUT-LOCK.

SPECIFICATION forming part of Letters Patent No. 378,563, dated February 28, 1888.

Application filed May 26, 1887. Serial No. 239,458. (Model.)

*To all whom it may concern:*

Be it known that I, HORATIO O. WHYMAN, of Norfolk, in the county of Madison and State of Nebraska, have invented certain new and useful Improvements in Nut-Locks; and I do hereby declare the following to be a full, clear, and exact description of the invention, such as will enable others skilled in the art to which it appertains to make and use the same.

My invention relates to an improvement in nut-locks.

The object is to provide a simple, cheap, and effective device for securely locking nuts on bolts and preventing their accidental displacement therefrom.

With these ends in view my invention consists in certain features of construction and combinations of parts, as will be hereinafter fully described, and pointed out in the claims.

Figure 1:
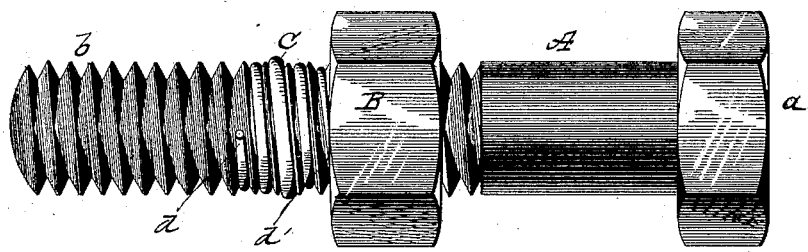
Figure 2:
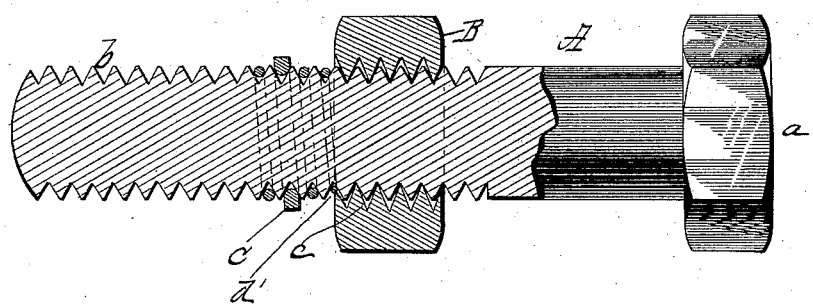
Figure 3:
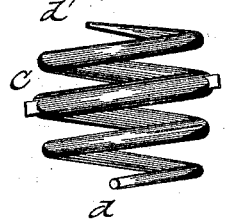

In the accompanying drawings, Figure 1 is a view in perspective of a bolt with a nut locked thereon by my improved lock. Fig. 2 is a longitudinal section through the bolt, nut, and nut-lock; and Fig. 3 is a detached view of the nut-lock.

A represents an ordinary bolt having a head, $a$, at one end and screw-threads $b$ at the other end. The nut B is also of the usual construction except that the screw-thread $c$ is preferably cut deeper than the rest of the thread. This construction, however, is not absolutely necessary, for ordinarily in bolts the groove between the turns of the thread is deeper than the thread of the nut, thus leaving an unoccupied space between the thread of the nut and the groove of the bolt, or vice versa.

C represents the nut-lock, and consists of a metallic band formed into a spiral, preferably of three or four coils a distance apart to correspond with the thread of the bolt, because each coil is adapted to rest between two adjacent turns of the thread. This band C tapers at both the ends $d$ $d'$—at the end $d$ so as to allow the outer end to be sunk in the groove out of the way, and at the end $d'$ in order to enter and fill the space between the nut and bolt by turning the band C until it tightly impinges the nut, the increasing thickness of the band toward its middle serving to gradually and the more perfectly fill this space. The middle of the band is considerably thickened to render it convenient to be grasped by the operator, and this portion may be made square to receive a wrench.

It is apparent that the lock serves as a wedge, and the more the nut works its way against the lock the tighter the former is fastened.

It is evident that slight changes might be made in my nut-lock without departing from the spirit and scope of my invention. Hence I do not wish to limit myself strictly to the particular construction herein set forth; but, Having fully described my invention, what I claim as new, and desire to secure by Letters Patent, is—

1. A nut-lock consisting of a spiral band, one end of which is tapered and adapted to enter the spiral groove between the bolt and nut, substantially as set forth.

2. The combination, with the interlocking faces of a bolt and nut, the latter having the outer turn of its groove cut deeper than the remaining turns, of a spiral nut-lock tapering at the end and adapted to enter the deep-cut turn of the groove when locking the nut, substantially as set forth.

In testimony whereof I have signed this specification in the presence of two subscribing witnesses.

HORATIO O. WHYMAN.

Witnesses:
 B. T. WHITE,
 BURT MAPES.